May 3, 1960 R. A. FISHER ET AL 2,935,220
AUTOMATIC MATTRESS MACHINERY
Filed Nov. 12, 1957 7 Sheets-Sheet 1

INVENTORS
Richard A. Fisher
Francis W. Gaudette
BY
*Coms, McDougall, Williams & Hersh*
Attorneys May 3, 1960 R. A. FISHER ET AL 2,935,220
AUTOMATIC MATTRESS MACHINERY
Filed Nov. 12, 1957 7 Sheets-Sheet 2
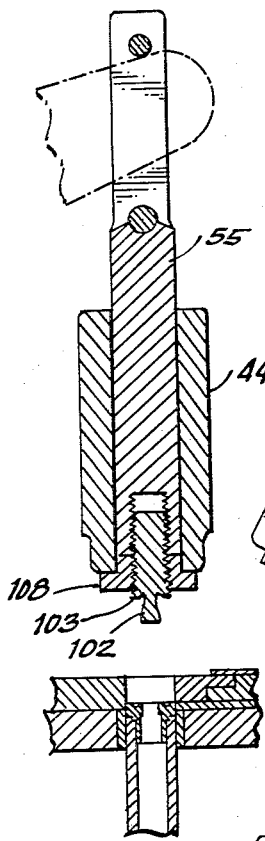
FIG. 3
FIG. 4
FIG. 5
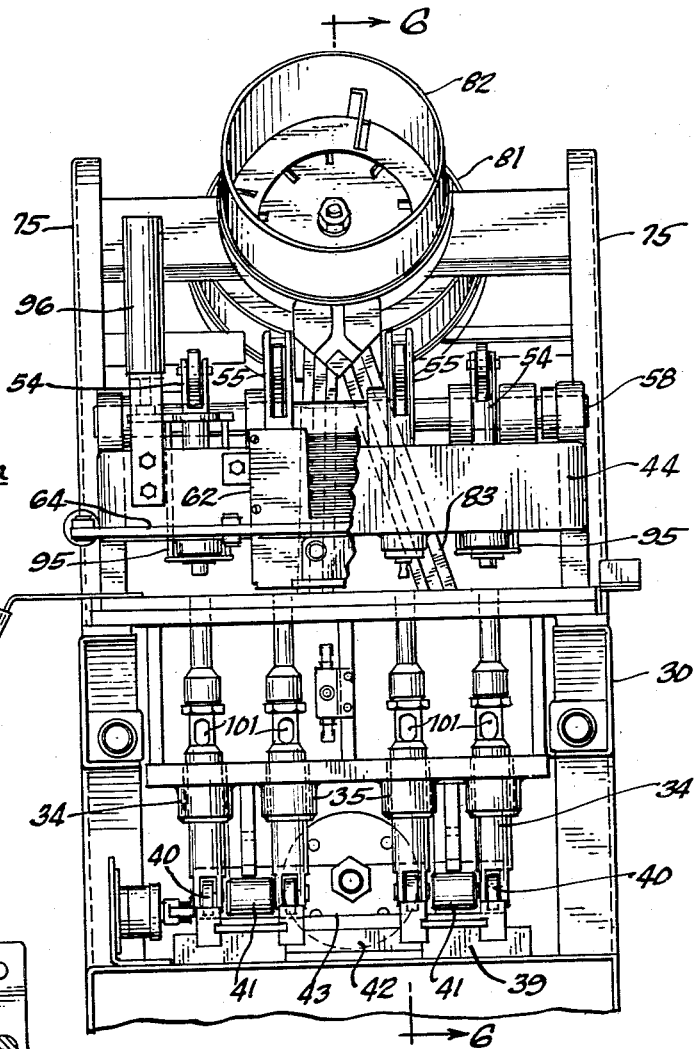
FIG. 2
INVENTORS
Richard A. Fisher
Francis W. Gaudette
BY
Ooms, McDougall, Williams & Hersh
Attorneys

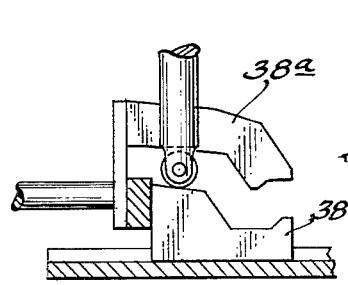
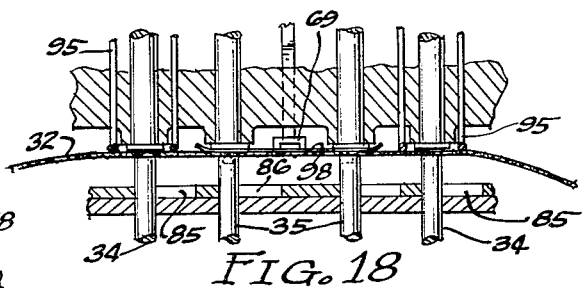
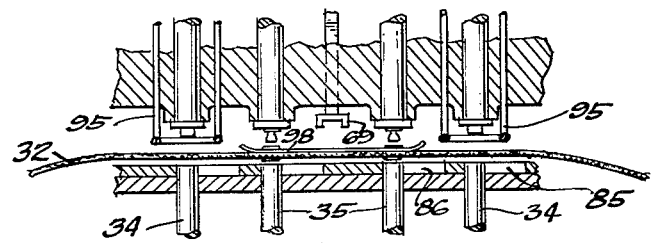
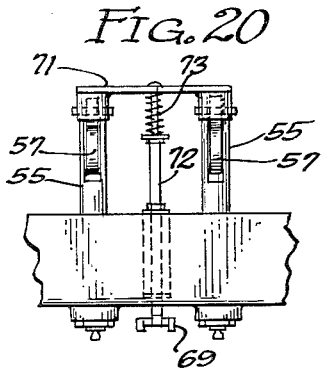
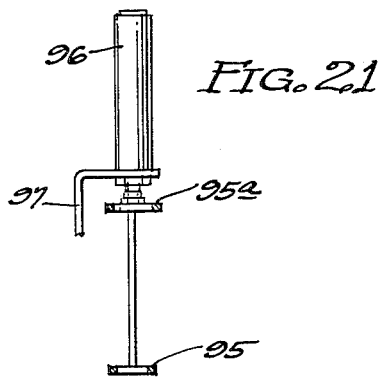

United States Patent Office 2,935,220
Patented May 3, 1960

2,935,220

AUTOMATIC MATTRESS MACHINERY

Richard A. Fisher, North Minneapolis, and Francis Wilfred Gaudette, St. Paul, Minn., assignors to The United States Bedding Company, St. Paul, Minn., a corporation of Minnesota Application November 12, 1957, Serial No. 695,662

2 Claims. (Cl. 218—.5)

This invention relates to the field of automatic mattress machinery and is particularly concerned with a machine for automatic insertion of grommets, vents, and back bars in the border or boxing strip which forms the sides and ends of an assembled mattress.

The boxing strip of a mattress must be perforated at intervals to receive handles, and, in addition, other perforations must be provided for ventilation. The handle perforations are reinforced with metal grommets, which also anchor in place, on the inner face of the border, a steel back bar which takes up the handle load and prevents the boxing strip from tearing out when the mattress is lifted by the handles.

The ventilating apertures of the border strip are likewise provided with reinforcement in the form of metal vents, which provide a neat appearance and prevent the mattress filler from escaping.

In the prior art the insertion of the vents, grommets and back bars has taken place in a plurality of separate steps. The primary object of the present invention is to provide a novel machine wherein, for the first time, all these operations on the boxing strip are performed automatically in a single machine cycle.

Our machine, in achieving this major objective, has also a number of other objects and advantages.

For example, an important object of our machine is to provide means for automatically feeding an apertured back bar into position on the back of a boxing strip and holding it while the strip is punched and grommets are inserted through both the strip and the back bar, thus permitting the crimping of the grommets to anchor the back bar and reinforce the handle apertures at the same time.

Another object and advantage of the present invention is to provide a set of dual-function dies which are adapted to function both as punches and crimping dies, the punching and crimping being performed in successive phases of a single stroke cycle.

Still another object of our invention is to provide novel dies which are adapted, in a single cycle of advancing and retracting movement, to punch holes in a boxing strip, to act as guides in the automatic feeding of grommets and vents, and finally, to crimp the grommets and vents permanently into the punched holes.

Other objects and advantages of the invention will appear from the following detailed description of a typical embodiment thereof.

In the appended drawings:

Figure 2 is a view in front elevation of the Fig. 1 machine with certain forwardly located parts removed, to show clearly the structure of the cam-operated dies.

Figure 3 is a fragmentary sectional view of one of the dual-function members which act as punches at one phase of the machine cycle and as crimping dies in a later phase thereof.

Figure 4 is a fragmentary sectional view showing part of the main bed plate of the machine and a portion of one of the other dual-function elements.

Figure 5 is a sectional fragmentary view of one of the punch-die elements used for punching the ventilating apertures and crimping metal vents therein.

Figure 17 shows the Fig. 11 cam in its fully advanced position.

Figure 18 is a diagrammatic sectional view through the bed plate of the machine, showing the lower die elements in the fully advanced position corresponding to the cam position illustrated in Fig. 17.

Figure 19 is a diagrammatic sectional view similar to Fig. 18, showing the end of the operation cycle.

Figure 20 is a fragmentary diagrammatic view of the inner pair of upper punch-die elements, showing the magnet mechanism which forms a part of the back-bar feed apparatus.

Figure 21 is a fragmentary view showing the structure of one of the stripper rings, together with its actuating cylinder.

Figure 1:
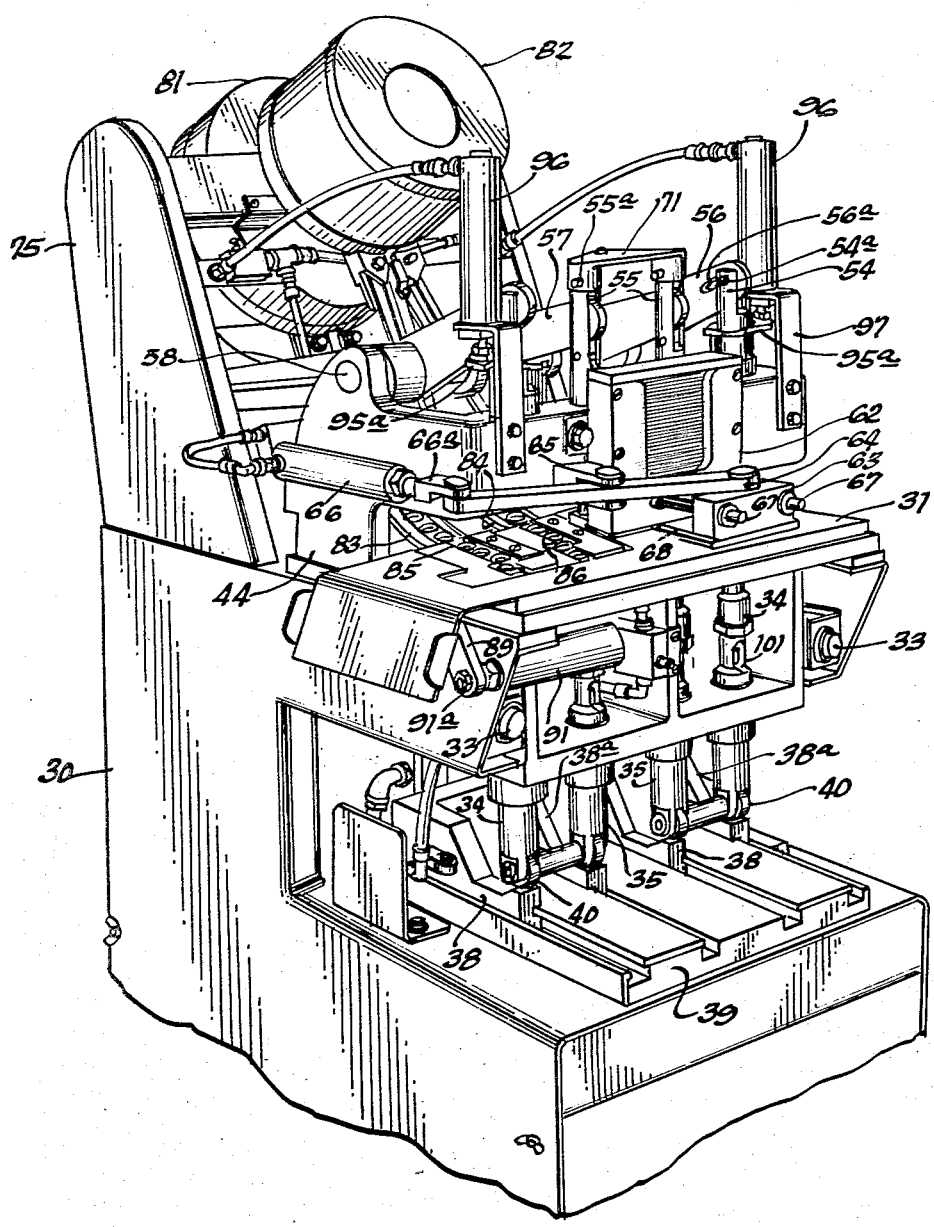
Figure 1 is a perspective view of a machine which employs the principles of our invention.
Figure 6:
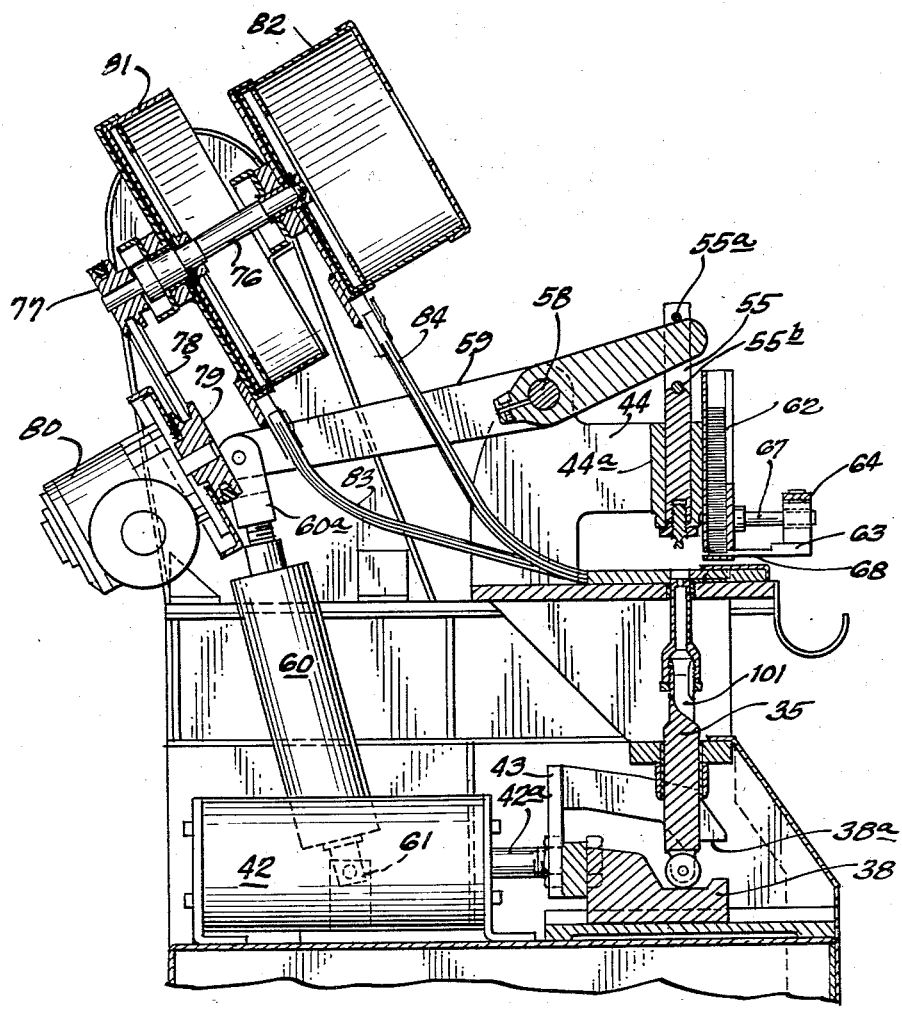
Figure 6 is a side view of the machine, mostly in section, taken along the line 6—6 in Fig. 2 and bringing out certain details of the mechanism.

In the drawing, our machine is shown mounted on a frame 30, the lower part of which may be enclosed. Preferably, the frame 30 is so designed as to support the base plate 31 at a convenient work height.

The boxing strip 32, of which a sample is shown in Figs. 7–10, is arranged to pass over the bed plate 31 from one side of the machine to the other, the strip being taken normally from a storage roll (not shown) and being intermittently advanced for cutting and further processing after it has passed through our machine. This movement of the strip through our machine may either be performed manually or by machine.

While our machine, by simple and obvious adaptations, can be made to operate in automatically timed cycles, the particular embodiment illustrated in the drawings is of the type in which each cycle of activity is initiated by manual actuation of starting buttons 33. This mode of operation enables the operator to make sure in each case that the strip is properly positioned on the bed plate 31 before machine operation is started. As a safety measure, we provide two starting buttons 33 which must be simultaneously pressed by the operator to start the machine, thus insuring that his or her hands are safety outside the machine before movement of the parts gets under way.

As we shall hereinafter explain in greater detail, the various moving parts of our machine are driven by compressed-air cylinders, the solenoid-actuated control valves for which are sequentially operated by means of cam-driven micro switches. Control mechanisms of this type for solenoid-actuated pneumatic valves are well known in the art and do not of themselves form any part of the present invention. We shall, therefore, simply describe in this specification the various cylinder operations in their proper time sequences and shall not describe in detail the conventional valve-control mechanism which establishes that sequence. A control mechanism suitable for use in our machine is manufactured by Industrial Timer Corporation of Newark, New Jersey, under the name "Single Cycle Multi-Cam Timer, Series RC."

Suitably mounted on the frame below the bed plate 31 are four spaced-apart elements which, for convenience, we shall call the "lower dies," their actual functions being those of female punching dies and grommet or vent guides. The lower dies are generally designated by the reference numerals 34 and 35, the two inner dies being designated 35 and the two outer dies being designated 34.

All four of the lower dies 34 and 35 are mounted in the frame for reciprocal vertical movement, their up and down motions being controlled by cams 38 which move forward and backward in a horizontal plane on tracks 39 carried on the frame below the lower dies. Each of the lower dies 34 and 35 has at its lower end a roller 40 which rolls on the upper surface of one of the cams 38. To insure positive control of the lower dies by the cams 38, auxiliary rollers 41 are provided which ride on the under surface of cam elements 38a. Cam elements 38a are rigidly secured to and form parts of the cams 38, and their under sides are shaped to correspond to that of the upper surfaces of the cams 38 proper. (See Figs. 1, 6, 11, 14, and 17.) Forward and backward movement of the cams 38 forces the rollers 40 and 41 to rise and lower, resulting in vertical movement of the dies 34 and 35.

The cams 38 are actuated by a pneumatic power cylinder 42, mounted on the frame behind cams 38 and connected to them by a piston rod 42a and a cross link 43.

Figure 11:
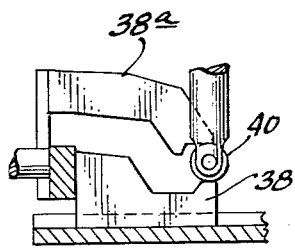
Figure 11 is a fragmentary and somewhat diagrammatic view of one of the principal cams governing the movement of the lower punch and die elements, the cam in Fig. 11 being in the position it occupies at the beginning of an operation cycle.

The pneumatic cylinder 42 may be of conventional design, containing a spring-loaded piston (not shown) which is normally retracted, holding cams 38 in the position shown in Figs. 1 and 11.

The detailed structure and operation of the lower dies 34 and 35 will be discussed later in this specification.

Above the bed plate 31, on a frame extension 44 provided for the purpose, are mounted four elements which, for convenience, will be called "upper dies," these elements also having dual functions as will be explained in detail hereinafter. The inner pair of these upper dies cooperate with the inner lower dies 35 and are designated 55, while the outer pair, designed and mounted for cooperation with the lower dies 34, are designated 54. The upper dies 55 and 54 are mounted for reciprocal movement in the vertical plane in bearings 44a formed in the upper frame extension 44, and they are moved up and down by means of driving arms 57 and 56. All of the arms 57 and 56 are keyed to a transverse shaft 58 journaled in suitable bearings formed in frame extension 44. Shaft 58 is rocked by means of a pair of backwardly extending arms 59, likewise keyed to shaft 58 and pivotally joined at their rear ends to the piston rods 60a of a pair of pneumatic power cylinders 60. (See Fig. 6.) The lower ends of the cylinders 60 are frame-supported by means of a universal joint 61 permitting the piston rods 60a to advance and retract without binding.

The power cylinders 60 are symmetrically spaced and operate as a unit. They both contain spring-loaded pistons (not shown), which are normally in the retracted position shown in Fig. 6.

The forwardly projecting arms 57 and 56 are provided with suitable slot linkages joining them to the upper dies 55 and 54. In the inner dies 55, elongated slots are provided in the die shafts, and the arms 57 project therethrough. Relative movement of the arms within the slots is limited by means of pins 55a and 55b. Grooved slots 56a and pins 54a provide a pin-and-slot linkage between the outer dies 54 and the arms 56.

Mounted on the front face of the upper frame extension 44 is a back-bar magazine 62, in which a number of steel back bars are stacked (Fig. 1). The back bars are removed from magazine 62, one at a time, by back-bar feeding mechanism which includes a pusher 63 and an actuating link 64. Link 64 is pivoted near its mid-point to a boss 65 on the front face of frame extension 44. One end of the link 64 is pivoted to the pusher mechanism 63, and the other end is pivoted to the piston rod 66a of a pneumatic power cylinder 66, which is mounted on frame extension 44 at the side of the machine, as may be best seen in Fig. 1. The pusher mechanism 63 is held for reciprocal movement in the horizontal plane by a pair of guide pins 67 projecting forward from the front face of back-bar magazine 62. It will be understood that the pivotal connections at the respective ends of link 64 are suitably slotted so as to afford freedom to the link 64 to rock on its central pivot as piston rod 66a is advanced and retracted.

The piston (not shown) in cylinder 66 is spring-loaded so as normally to occupy the retracted position shown in Fig. 1. On advance of the piston in cylinder 66, the link 64 rocks on its central pivot and causes the pusher mechanism 63 to move inward toward the back-bar magazine. At the lower extremity of pusher 63 we provide a selector blade 68 which enters a cooperating slot in the bottom of the magazine 62 and pushes the bottom back bar rearwardly out of the back-bar magazine 62.

As a back bar is pushed out of the magazine it is picked up and held by the back-bar gripping magnet 69 (Figs. 18–20). Magnet 69 is supported on arm 72 by a plate 71, which in turn is mounted on the dies 55 at their upper ends. Arm 72 passes through an aperture in the plate 71 and is secured therein by a yieldable spring linkage, as shown in Fig. 20, which causes the shaft 72 to move down with the dies 55.

Supported on a rearward frame extension 75 are a pair of rotatable hoppers or magazines within which the grommets and vents are held and fed to the machine. The hoppers are mounted, one in front of the other, on a common shaft 76 which is journaled in bearings formed in the frame, and a suitable means, such as pulleys 77 and 79 and a belt 78, are provided for rotating the shaft 76 responsively to torque supplied by an electric motor 80. The rear hopper 81 serves as a magazine for the vents, while the forward hopper 82 acts as a magazine for the grommets.

Figure 7:
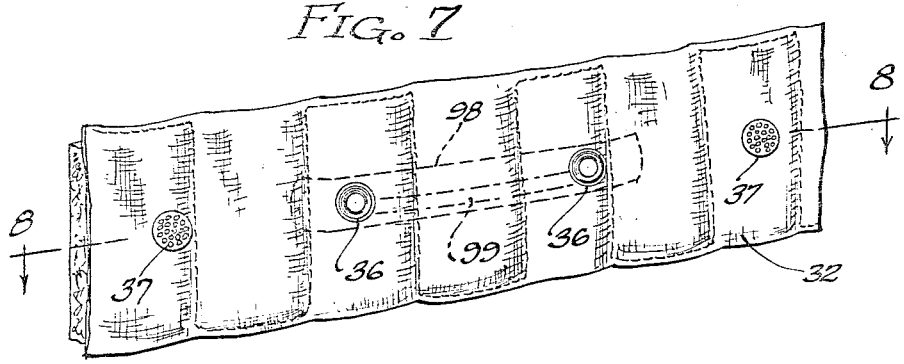
Figure 7 is a front-elevation view of the boxing strip, showing its appearance after the operations performed by our invention have been completed.
Figure 9:
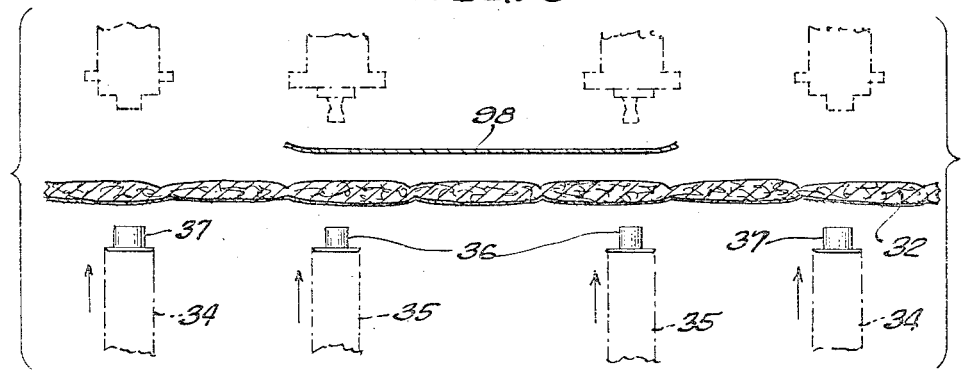
Figure 9 is a diagrammatic view showing the boxing strip of Fig. 7 prior to the machine operations thereon.

As may be seen from Figs. 7 and 9, the vents 37 and grommets 36 are essentially alike except that the vents have webbed heads having a number of small perforations, whereas the grommets have annular heads containing a single large aperture. The perforated webs in the vents permit free air passage without providing openings large enough to permit the escape of filler material.

The vents are fed from the magazine 81 in single file down to the bed plate 31 via tracks or ways 83, there being a track 83 leading to the bed plate adjacent each of the dies 34. Similarly, a pair of tracks 84 guide the grommets from rotating hopper 82 down to the bed plate adjacent each of the inner dies 35. The bed plate 31 has grooves in its upper surface communicating with the tracks 83 and 84, grooves 85 being fed by tracks 83 and grooves 86 being fed by tracks 84. The tracks or ways 83 and 84 are steeply inclined in their rearward portions in order to afford an effective gravity feed of the grommets and vents.

The grooves 85 and 86 are deep enough to receive the grommets and vents, head downward, without having their shanks protrude above the level of the bed-plate surface. If desired, these grooves may be roofed over with a thin cover plate.

The upper ends of the tracks 83 and 84 are arranged to receive from the hoppers 81 and 82 a continuous stream of grommets or vents, as the case may be, as they tumble into position within the rotating hoppers. Apparatus of this type for feeding small objects of this kind in single file to a work position are widely used in automatic machines and do not of themselves form any part of this invention. We therefore have included herein no detailed description of this mechanism. It will also be understood that any suitable arrangement for maintaining a supply of grommets and vents in the grooves 86 and 85 of the bed plate may be substituted for the arrangement shown.

Throughout most of their length across the upper surface of the bed plate 31, the grooves 85 and 86 are just wide enough to afford easy passage for the grommets and vents as they advance in single file, heads downward. In the portion of the grooves 85 and 86 adjacent the lower dies 35 and 34, however, the grooves are widened out, as shown in Fig. 16, and in each of them a pusher element 87 is disposed, the thickness of the pusher elements 87 being somewhat less than the depth of the slots.

The pushers 87 are all secured to a transverse rod 88 which rides in a groove cut transversely in the bed plate 31. The rod 88 extends outward beyond the left end of the bed plate 31, as viewed in Fig. 1, and it is there operatively connected by means of a link 89 to the piston rod 91a of a pneumatic power cylinder 91, mounted on the frame beneath the bed plate. (This cylinder may be seen in Fig. 1; it is not shown in Fig. 2, however, cylinder 91 and a few other forwardly mounted parts having been omitted from Fig. 2 in order to show the structural details of the parts lying behind them.)

Figure 16:
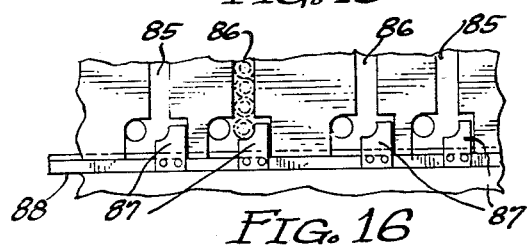
Figure 16 is a diagrammatic plan view of a portion of the bed plate, bringing out the manner in which the grommets and vents are guided into position over the lower dies.
Figure 22:
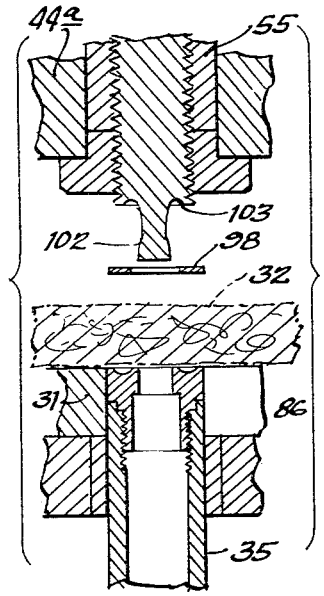
Figure 22 is a fragmentary sectional view showing the die elements immediately before the beginning of the punching operation, with the boxing strip in position to be punched.

Power cylinder 91, like the other power cylinders already mentioned, contains a spring-loaded piston (not shown) whose normal position is retracted, the rod 88 and the pushers 87 being under those conditions in the position shown in Fig. 16. When compressed air is admitted to cylinder 91, the piston moves to the left, as viewed in Fig. 1, and the pushers 87 are accordingly moved to the left by the rod 88, picking off the foremost grommet or vent in each of the tracks 85 and 86 and sliding it onto the upper surface of the adjoining die 34 or 35, as the case may be. As shown in Fig. 16, the leading edges of the pushers 87 may if desired be provided with curved recesses adapted to fit the shanks of the grommets or vents.

The outer pair of upper dies 54 are surrounded by rings or strippers 95, which hold the boxing strip against slippage during the punching operation and strip it off the dies after the crimping operation. The strippers 95 comprise metal rings, disposed around the dies 54 near their lower extremities, and supported by a pair of vertical rods which extend upward alongside the dies 54 to an apertured bracket 95a (Fig. 21). The brackets 95a are respectively bolted to the piston rods of a pair of power cylinders 96, which are frame-mounted by means of brackets 97.

Figure 12:
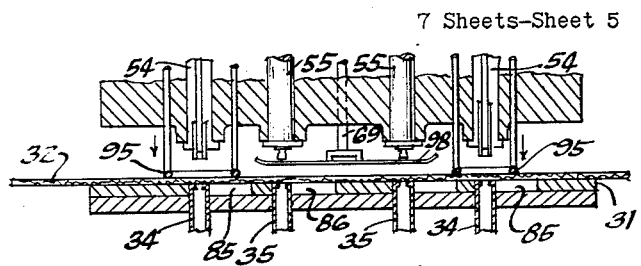
Figure 12 is a diagrammatic sectional view through the bed plate of the machine, showing the positions of the upper and lower punch and die elements when the cam of Fig. 11 is in the position therein shown.
Figure 13:
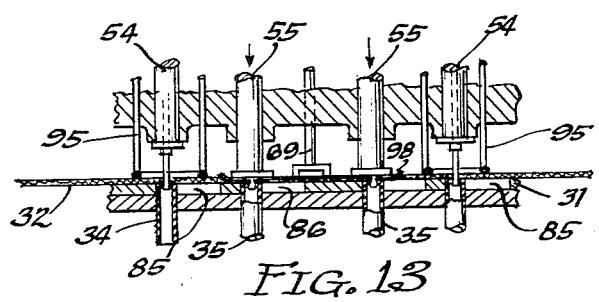
Figure 13 is a view generally like Fig. 12, showing the upper punch-die elements at the bottom of the punching stroke.
Figure 14:
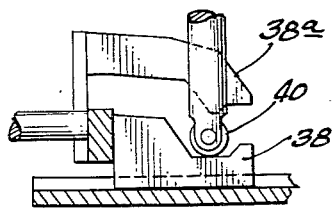
Figure 14 is another view of the Fig. 11 cam, shown in its partially advanced position.
Figure 15:
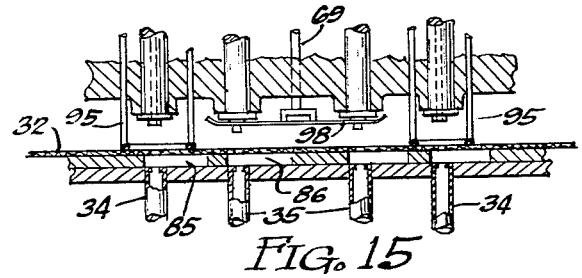
Figure 15 is a diagrammatic sectional view through the bed plate of the machine, generally similar to Fig. 12 but showing the lower die elements in the position corresponding to that of the cam in Fig. 14.

The power cylinders 96 contain pistons (not shown) which are normally spring biased in retracted position, at which the strippers 95 are held above the bed plate 31, as shown in Fig. 18. On admission of compressed air to the cylinders 96, the strippers 95 are moved downward into contact with the boxing strip 32, holding it firmly against the bed plate during the punching operation to be described in a later paragraph. This position of the strippers 95 is shown in Figs. 12, 13, and 15.

All of the pneumatic power cylinders employed in our machine are provided with suitable air conduits and solenoid-actuated control valves, for feeding compressed air into the cylinders. The timing of the valve operations as previously mentioned, may be controlled by a bank of cam-operated micro switches (not shown), or other equivalent means. Since these elements are conventional and do not per se form a part of our invention, they need not be shown or described in detail.

In the embodiment described, all of the power cylinders discharge their air directly to atmosphere. Mufflers may be employed on the atmosphere ports, if desired, to reduce noise. Also, to permit accurate coordination of the cylinder operations with one another, the atmosphere vents may be provided with adjustable needle valves or equivalent means permitting the exhaust rate to be adjusted.

Having now described the general structural features of our machine, we shall now describe briefly, in connection with Figs. 7–10, the boxing strip and the operations performed on it by our machine. Then we shall describe the operation of our machine.

Figure 10:
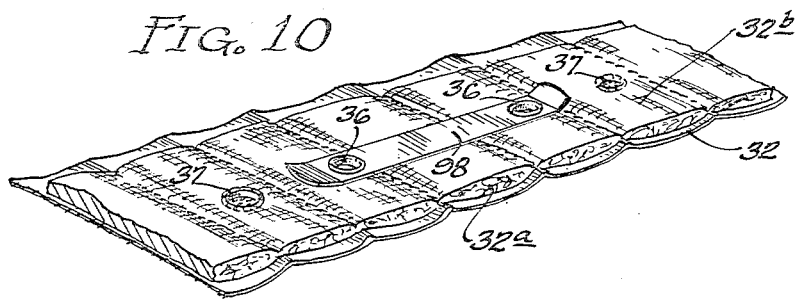
Figure 10 is a perspective view showing the inner side of the boxing strip of Fig. 7 after completion of the machine operation thereon.

The front face of a section of boxing strip is shown in Fig. 7, and its rear face appears in Fig. 10. From these it can be seen that the strip consists of an outer layer of tough, closely woven cloth, to the rear side of which a layer a padding 32a and a retaining gauze layer 32b have been stitched. When the boxing strip 32 is drawn across the bed plate 31 of our machine it is uniform and unperforated, as indicated in the exploded view of Fig. 9. Our machine, in steps presently to be described, first punches four spaced holes in the boxing strip. Prior to the punching operation, a steel back bar 98 is moved by our machine into position over the portion of the strip in which inner pair of holes are to be punched, the back bar being already provided with apertures spaced to register with such holes. Thereupon grommets are inserted through the inner holes in the boxing strip and through the back bar, vents being at the same time inserted in the outer holes. The vents and grommets are thereupon crimped, producing a final product as shown in Figs. 8 and 10, wherein the vents are permanently affixed in the ventilating apertures and the grommets are likewise permanently secured in the handle openings, the back bar 98 being at the same time anchored in position.

Figure 8:
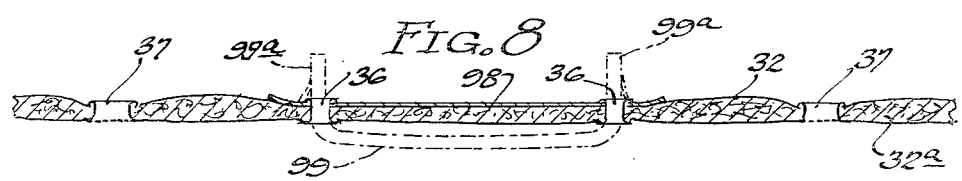
Figure 8 is a sectional view of the boxing strip of Fig. 7, along the line 8—8 of Fig. 7.

A handle 99, shown in dotted lines in Figs. 7 and 8, consisting of a strong rope-like cord tipped with clamped metal terminals 99a, may be inserted through the grommets 36 from the front. The terminals 99a have spreadable ears which, after insertion of the handle, may be spread out as indicated in Fig. 8, bearing against the rear side of the back bar 98 and thus preventing the handle from pulling out. Force applied to the handle is transmitted through the terminals 99a directly to the back bar 98 and is thereby spread over a large area of the boxing strip, affording great strength and resistance to tearing.

We shall now describe in detail the operation of our machine and, in so doing, shall discuss the structural details of the dual-function punch-die elements which form an important part of our invention.

Before starting the machine, the operator checks the position of the boxing strip spread across the bed plate 31. Having ascertained that it is correctly positioned, the operator then presses simultaneously the starting buttons 33 which turn on the electrical valve-control mechanism heretofore mentioned and thereby start the machine's operation cycle. The buttons need not be held down; once the cycle of operation has been started, it will continue until completed, as is conventional in automatic machinery of this type. At that time, the piston of power cylinder 42 is in its normal retracted position, the cams 38 being accordingly in the position shown in Fig. 11. Under those circumstances, the upper ends of the dies 34 and 35 are flush with the top of the bed plate 31, as shown in Fig. 12.

At the beginning of the cycle, air is fed substantially at the same time to the stripper cylinders 96, the back-bar feed cylinder 66, and the punch cylinders 60. Thereupon, the stripper rings 95 press down against the boxing strip 32, a back bar is picked off from the bottom of the magazine 62 and fed to magnet 69, and the upper dies 55 and 54 start to move downward. The lost motion in the mechanical linkage connecting the cylinders 60 with the upper dies causes the downward movement of the upper dies to lag slightly behind the action of the stripper and the back-bar feed mechanism, so that the back bar 96 is in position on magnet 69 and the stripper rings 95 are pressing against the boxing strip 32 before the upper dies have descended appreciably. (Fig. 12).

Figure 23:
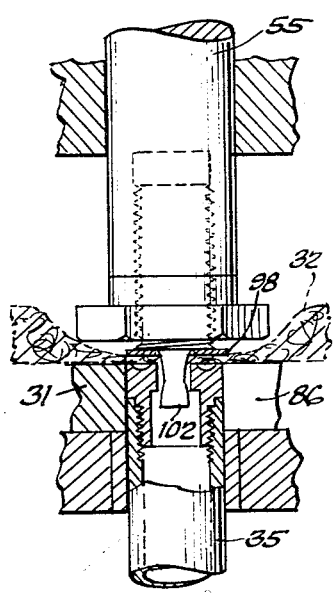
Figure 23 is a fragmentary sectional view showing the position of the punch-die elements at the completion of the punching step.

Thereupon, the upper dies complete their descent, compressing the boxing strip against the lower dies 35 and 34 and punching plugs of material out of the boxing strip. The cut plugs drop into the hollow interiors of the lower dies 35 and 34 and are discharged through the escape passages 101. (See Figs. 23, 13, and 6.)

As may be observed from Figs. 12, 13, 22, and 23, the male punching dies 102 at the lower ends of upper dies 55 pass through the apertured back bar 98 before penetrating the boxing strip 32.

The male punching dies 102 carried at the lower extremities of the upper dies 55 are adjustably but fixedly secured in the lower end of the dies 55 by the use of threads and lock nuts 108, as shown in Fig. 3. The threaded member carrying punch member 102 has an annular skirt portion at the base of punch 102 which is shaped to define a crimping die 103. This may be seen in Fig. 3 and is also clearly brought out in Figs. 22–26. The dual function which is permitted by this construction is an important feature of our machine.

The dies 54, which also perform the dual functions of punching and crimping, have a construction different from that of dies 55, necessitated by the webbed heads of the vents. The male punch members 104 of dies 55 are mounted centrally of the frame support 44a and are surrounded by a cylindrical sleeve 105, which is modified at its upper end to form a spring seat for a stiff coil spring 106. The other end of spring 106 is seated against a shoulder provided therefor near the upper end of the male punch member 104.

The sleeve 105 extends normally a short distance below the lower end of the punch member 104, serving during the crimping operation as a retractable guide means to keep the shanks of the vent elements properly aligned when they engage the crimping die 107, which is fixedly held in the support member 44a.

During the punching operation now being described, the downward movement of arm 56 forces the punch element 104 downward beyond the lower extremity of sleeve 105, forcing the boxing strip 32 against the corresponding female die in lower die elements 34 and punching a plug therefrom. This operation is shown in Fig. 13.

After completion of the punching step, the air is removed from the cylinders 60 and they are vented, resulting in the return of the upper dies 55 and 54 to their normal positions. During the same interval, air is supplied to the power cylinder 42, advancing the cams 38 and lowering the dies 34 and 35 to their lowest position, shown in Figs. 14, 15, and 16. At this stage, the upper surfaces of the lower dies 35 and 34 are flush with the bottoms of the grooves 85 and 86 which carry the grommets and vents from their respective storage magazines.

When the dies 35 and 34 have retracted fully, the pushers 87, responsively to air supplied to cylinder 91, move to the left and place a grommet, head down, directly over each of the dies 35 and place a vent, likewise head down, directly over each of the dies 34. The upper surfaces of the dies 34 and 35, in the annular zone around the female punching dies, are shaped to conform to the heads of the vents and grommets respectively, thus adapting them to hold the vents and grommets during the crimping step.

Figure 24:
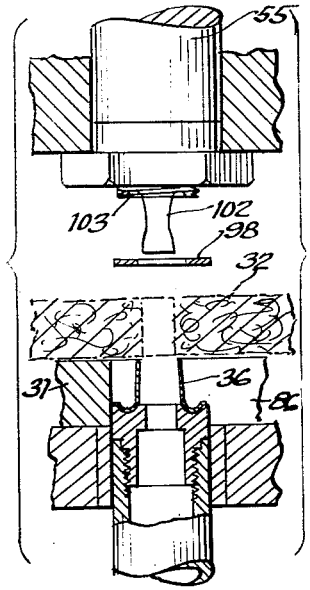
Figure 24 is a fragmentary sectional view showing the relative positions of the upper and lower punch-die elements in a later portion of the operation cycle, in which the lower dies are moved upward, pushing the grommets through the punched apertures in the boxing strip.

By the time the vents and grommets are seated on the lower dies 34 and 35, the rollers 40 have engaged the inner riser portions of the still-advancing cams 38, and the lower dies 35 and 34 accordingly move upward, as shown in Fig. 24, forcing the shanks of the grommets and vents through the boxing strip 32 as they go.

Shortly after the upward movement of the lower dies has commenced, air is released from the stripper cylinders 96 and venting of those cylinders is commenced, it being, however, sufficiently controlled by the exhaust valve to cause the strippers 95 to rise substantially in step with the rising dies 34, so that the boxing strip 32 is held against lateral movement during this portion of the operation. (Similarly the rate of air introduction into the power cylinder 42 is valve-controlled to coordinate the advance of cams 38 with the operations of the cylinders 91 and 96.)

As the lower die members 34 and 35 continue to rise, in response to continued advance of the cams 38, the grommets and vents, after passing through the boxing strip 32, come into engagement with the crimping dies which are formed on the lower faces of the upper die members 54 and 55.

Figure 25:
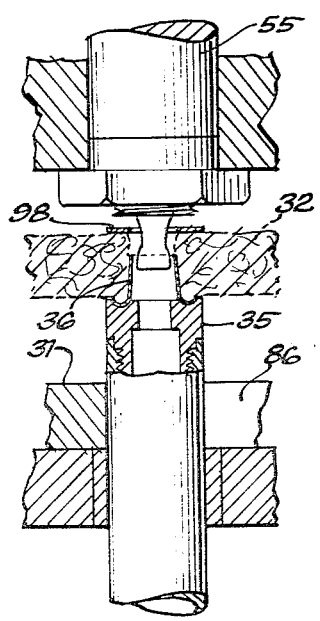
Figure 25 is a fragmentary sectional view showing the relative positions of the punch-die elements when the lower dies have raised the grommets almost into engagement with the crimping dies.
Figure 26:
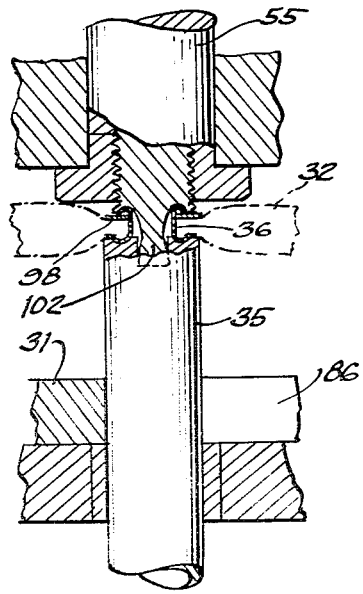
Figure 26 is a view generally like Fig. 25, but showing the upper and lower die elements in engagement, crimping a grommet permanently into the boxing strip.

The vents 37, before actually reaching the crimping dies, pass over and are centered by the sleeves 105, which, however, retract to permit the vents to be crimped on dies 107, as described in the next paragraph. A similar guiding or centering function is provided for the grommets 36 by the downwardly projecting male punching dies 102. There is no need for the dies 102 to retract, however, since the apertures in the grommet heads are large enough to let the dies 102 pass through them (Figs. 25 and 26).

The grommets and vents come into engagement with the crimping die surfaces 103 and 107, respectively, at approximately the instant the rollers 40 pass off of the steeply rising portion of cams 38 and enter the gradually rising portion at the rear of the cams. As the cams continue to advance, the mechanical advantage of the system is greatly increased because of the gradual rise, and the shanks of the grommets 36 and vents 37 are thereupon crimped outwardly and downwardly, locking the vents and grommets securely in the boxing strip 32, as shown in Fig. 8. The various steps of the grommet-crimping operation are shown in Figs. 24–26.

To facilitate crimping, the shanks of the vents and grommets are scored in the course of their manufacture. This insures a uniform and consistent deformation during the crimping operation and is a conventional procedure.

Upon completion of the crimping step, the air is released from power cylinder 42, and the cams 38 thereupon rapidly return to their normal rest position, as shown in Fig. 11. This results, of course, in the backing away of the lower dies 34 and 35. While this is going on, air is again admitted to the stripper cylinders 96, and the stripper rings 95 are thereupon again forced downward, peeling away the boxing strip 32 from the crimping dies and disengaging the back bar 98 from its holding magnet 69. The air is left on the stripper cylinders 96 only long enough to insure that the boxing strip 32 is wholly free of the upper dies and the magnet, the air in the cylinders 96 being then again vented to return strippers 95 to their retracted position.

This completes the cycle of operation of our machine and restores it to readiness for initiation of a new cycle. In the embodiment shown, this will not occur until the starting buttons 33 are again pressed by the operator, the interval between the machine operations allowing time for the boxing strip to be advanced and positioned on the bed plate for the next machine cycle.

If the advance of the boxing strip is automatically performed by a suitable machine, our machine can of course be readily arranged for completely automatic operation, with a predetermined time interval provided between successive cycles to permit the boxing strip to be moved. Since such an arrangement is a matter of design well within the skill of the art, a detailed description of such an arrangement is unnecessary in this specification.

Various modifications in the structure described may be made by persons skilled in the art without departing from the spirit of our invention. Thus, while we have described an arrangement in which the back bars 98 are fed into position on the holding magnet 69 prior to the initial punching operation, this function may, if desired, be performed at a later stage of the cycle, after the punching has been completed and the upper dies have returned to their retracted position. Many other modifications of the same sort may be made. It is accordingly our desire that the scope of our invention be determined primarily by reference to the appended claims, and that the foregoing detailed specification be regarded as essentially illustrative rather than limiting.

We claim:

1. In a machine for inserting grommets and the like into mattress boxing strip, the combination comprising a bed plate for supporting the boxing strip, a plurality of die elements mounted below said bed plate in spaced-apart relation, each of said dies being relieved on its top surface to define a female punching die and being annularly modified therearound to define a seat for a grommet head, cam means operatively connected with said dies operable to move said dies at right angles to said bed plate, the top surfaces of said dies being at the first position of said cam means substantially flush with the top of said bed plate, being at the second position of said cam means disposed below the top surface of said bed plate, and being at a third position of said cam means advanced substantially above said bed plate, a plurality of other dies mounted above said bed plate and positioned for cooperation with said first-mentioned dies, each of said other dies comprising a male punching die and an annular shoulder skirting said male die, said shoulder being shaped to define a crimping die for crimping the shank of a grommet, first motive means operative to move said cam means successively through its first, second, and third positions in accordance with a predetermined timed cycle of movement, second motive means operative when said lower dies are flush with said bed plate to move said upper dies into engagement with said lower dies for punching a boxing strip resting on said bed plate, means operative when said lower dies are below the bed plate to place a grommet, head down, on each of said seats formed in said dies, said lower dies, in rising to their said elevated position, being operative to push said grommets through said punched boxing strip and to engage the same against said upper crimping dies, crimping said grommets permanently into said boxing strip.

2. The combination of claim 1 having also a back-bar magazine adapted to hold a plurality of apertured back bars, means operative before said cam means moves to its third position for stripping off a back bar from said magazine and transporting it to a position under said upper dies, and holding means operatively connected with said upper dies and supplied by said transporting means for holding said back bar in position under said upper dies during the crimping of said grommets, whereby said grommets anchor said apertured back bar to said boxing strip.

References Cited in the file of this patent

UNITED STATES PATENTS

| | | |
|---|---|---|
| 517,485 | Ryno | Apr. 3, 1894 |
| 1,105,872 | Bernard | Aug. 4, 1914 |
| 1,838,973 | Wilder | Dec. 29, 1931 |
| 2,007,274 | Johnson | July 9, 1935 |
| 2,357,888 | Gookin | Sept. 12, 1944 |